United States Patent [19]

Amini

[11] Patent Number: 5,139,763
[45] Date of Patent: Aug. 18, 1992

[54] CLASS OF STABLE POTASSIUM MONOPERSULFATE COMPOSITIONS

[75] Inventor: Bijan Amini, Moorestown, N.J.

[73] Assignee: E. I. du Pont de Nemours and Company, Wilmington, Del.

[21] Appl. No.: 665,641

[22] Filed: Mar. 6, 1991

[51] Int. Cl.$^5$ .............................................. C01B 15/06
[52] U.S. Cl. .................................. 423/513; 252/186.43
[58] Field of Search ..................... 423/513; 252/186.43

[56] References Cited

U.S. PATENT DOCUMENTS

| | | | |
|---|---|---|---|
| 2,802,722 | 8/1957 | Stephanou | 23/114 |
| 2,901,318 | 8/1959 | D'Addieco | 23/114 |
| 2,901,319 | 8/1959 | D'Addieco | 23/114 |
| 3,036,885 | 5/1962 | Müller et al. | 23/114 |
| 3,041,139 | 6/1962 | D'Addieco et al. | 23/114 |
| 4,579,725 | 4/1986 | Jayawant | 423/513 |

FOREIGN PATENT DOCUMENTS

| | | | |
|---|---|---|---|
| 621354 | 2/1963 | Belgium | 423/513 |
| 575441 | 5/1959 | Canada . | |
| 1080083 | 12/1985 | Fed. Rep. of Germany | 423/513 |
| 844096 | 8/1960 | United Kingdom . | |
| 979450 | 1/1965 | United Kingdom . | |

Primary Examiner—Gary P. Straub
Attorney, Agent, or Firm—P. Michael Walker

[57] ABSTRACT

A stable, nonhygroscopic potassium monopersulfate composition comprising KHSO$_5$, KHSO$_4$ and K$_2$SO$_4$ having a composition represented by a point within the closed curve of FGHIF of FIG. 1.

A process for preparing a stable, nonhygroscopic potassium monopersulfate composition having the following formula:

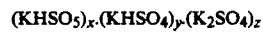

where $x+y+z=1$ and $x=0.48-0.64$, $y=0.15-0.37$, and $z=0.15-0.37$ includes providing Caro's acid having a molar ratio of H$_2$SO$_5$/H$_2$SO$_4$ of 1.6 or more and a water content of 40 to 65 weight percent, partially neutralizing the Caro's acid with a basic potassium compound to form a reaction mixture having a potassium to sulfur ratio (K/S) of 1.15 to 1.25 and a molar ratio of KHSO$_5$/(KHSO$_4$+K$_2$SO$_4$) greater than 1.0, adding the reaction mixture to a solution having a molar ratio of KHSO$_5$/(KHSO$_4$+K$_2$SO$_4$) greater than 2.5 to produce a final mixture having a molar ratio of KHSO$_5$/(KHSO$_4$+K$_2$SO$_4$) of between 1.3 and 7.3, concentrating the final mixture in a vacuum crystallizer to produce a slurry, separating the slurry into a wet cake and a mother liquor, and drying the wet cake.

An alternative process for preparing the triple salts includes using a triple salt of Caro's acid as the starting material, removing K$_2$SO$_4$ from the starting material to produce a filtrate, neutralizing the filtrate, adding the neutralized filtrate to a KHSO$_5$-rich solution to produce a final mixture, crystallizing the mixture to produce a slurry, separating a wet cake from the slurry, and drying the wet cake.

31 Claims, 1 Drawing Sheet

CLASS OF STABLE POTASSIUM MONOPERSULFATE COMPOSITIONS

BACKGROUND OF THE INVENTION

1. Field of the Invention

The present invention relates to a novel class of stable, nonhygroscopic compositions of potassium monopersulfate, potassium hydrogen sulfate and potassium sulfate having the formula $$(KHSO_5)_x \cdot (KHSO_4)_y \cdot (K_2SO_4)_z$$

where $x+y+z=1$ and $x=0.48-0.64$, $y=0.15-0.37$, and $z=0.15-0.37$, together with processes for making these compositions.

2. Description of the Related Art

U.S Pat. No. 2,901,319 discloses a method for preparing potassium monopersulfate by reacting a mixture of $H_2SO_5/H_2SO_4$ in a mole ratio of 2 to 10:1 with $K_2CO_3$, $KHCO_3$ or KOH using a mole ratio $K:H_2SO_5$ of from 0.6-1.2 at a temperature of from -10 to 40° C. The product is washed with ethanol and dried using a vacuum.

U.S. Pat. No. 3,036,885 discloses reacting hydrogen peroxide, potassium peroxydisulfate and fuming sulfuric acid, cooling the reaction mixture, bringing the pH to 1-2 with an alkali and evaporating moisture from the resulting salts until they are dry.

U.S. Pat. No. 3,041,139 discloses preparing monopersulfate compositions containing the triple salt $KHSO_4 \cdot K_2SO_4 \cdot 2KHSO_5$ by neutralizing a mixture of $H_2SO_5$ and $H_2SO_4$ with a basic potassium compound to form an aqueous solution which on drying contains the triple salt $KHSO_4:K_2SO_4:2KHSO_5$. The compositions of the '139 patent are shown by the closed curve ABCDA of FIG. 1. The '139 patent teaches that compositions to the right of the line CD in FIG. 1 are unstable.

British Pat. No. 979,450 discloses reacting hydrogen peroxide with concentrated sulfuric acid or oleum to form a monopersulfuric acid solution, adding potassium bisulfate or potassium sulfate to the monopersulfuric acid solution, neutralizing the resulting solution with a solution of a basic potassium compound and air drying the neutralized solution.

Canadian Pat. No. 575,441 discloses treating dried potassium monopersulfate containing mixtures with magnesium carbonate.

U.S. Pat. No. 4,579,725 discloses the preparation of a storage-stable salt primarily composed of $KHSO_5$ and $KHSO_4$, and optionally $K_2SO_4$, by providing a mixture of $H_2SO_5$ and $H_2SO_4$ having a molar ratio of $H_2SO_5:H_2SO_4$ of 1:1 to 7:1, neutralizing the mixture with a basic potassium compound to form a reaction mixture having a molar ratio of potassium to sulfur of from 0.4:1 to 1:1, maintaining a slurry concentration in the reaction mixture of 3 to 40% of substantially cavity-free crystals containing $KHSO_5$, maintaining the slurry at about 15-35° C., and separating the reaction mixture into a substantially liquid-free crystalline cake and a mother liquor stream at about 15-35° C.

SUMMARY OF THE INVENTION

The present invention relates to a novel class of stable, nonhygroscopic compositions of potassium monopersulfate, potassium hydrogen sulfate and potassium sulfate having the formula $$(KHSO_5)_x \cdot (KHSO_4)_y \cdot (K_2SO_4)_z$$

where $x+y+z=1$ and $x=0.48-0.64$, $y=0.15-0.37$, and $z=0.15-0.37$, together with processes for making these compositions. The compositions of the invention do not melt below 90 C, and have an active oxygen (a.o.) content of 4.9 to 6.7%.

A preferred process for making the inventive compositions includes preparing Caro's acid (a mixture of monopersulfuric acid ($H_2SO_5$), sulfuric acid, water and residual hydrogen peroxide) having a molar ratio of $H_2SO_5/H_2SO_4$ of 1.6 or more and a water content of 40 to 65 wt.%, partially neutralizing the Caro's acid with a basic potassium compound to form a reaction mixture having a potassium to sulfur ratio (K/S) of 1.15 to 1.25 and a molar ratio of $KHSO_5/(KHSO_4 + K_2SO_4)$ greater than 1.0, adding the reaction mixture to a solution that is richer in $KHSO_5$ than the reaction mixture and that has a molar ratio of $KHSO_5/(KHSO_4 + K_2SO_4)$ greater than 2.5 to produce a final mixture having a molar ratio of $KHSO_5/(KHSO_4 + K_2SO_4)$ between 1.3 and 7.3, concentrating the final mixture in a vacuum crystallizer until the water content of the final mixture is 12-40 wt.% to produce a slurry containing between 14 and 60 wt.% solids at about 15 to 35° C., separating the slurry with a filter or a centrifuge into a wet cake and a mother liquor, and recovering and drying the wet cake to produce the compositions of the invention.

The $KHSO_5$-rich solution is conveniently and economically obtained by reusing a mother liquor from a previous crystallization of the inventive compositions, or the solution may be prepared by other means.

The dried cake can be blended with 1-5 wt.% of a magnesium compound anticaking agent, such as $MgCO_3$, $Mg(OH)_2$, MgO, or mixtures thereof. The anticaking agent may also be added to the wet cake before drying, or may be omitted altogether.

An alternative process for preparing the inventive compositions is to use a starting material of commercially available monopersulfate products such as Oxone ® monopersulfate compound made by the Du Pont Company. Oxonea ® has a minimum a.o. specification of 4.5%, which is lower than the active oxygen content of 4.9 to 6.7% of the compositions of this invention. A higher active oxygen content is desirable for certain applications that require a stronger product. The a.o. content of commercial Oxone ® is lower than the compositions of the present invention because Oxone ® has a higher percentage of $KHSO_4$ and $K_2SO_4$.

The alternative process includes dissolving Oxone ®, or any other product containing the triple salt $2KHSO_5 \cdot KHSO_4 \cdot K_2SO_4$, in an amount of water insufficient to dissolve all the triple salt, removing the undissolved portion of the triple salt, which is essentially undissolved $K_2SO_4$, to obtain a first filtrate, adding a potassium base at 15 to 35° C. to the first filtrate to neutralize part of the remaining $KHSO_4$ in the first filtrate to additional insoluble $K_2SO_4$, removing the precipitated $K_2SO_4$ from the neutralized first filtrate to yield a second filtrate that is rich in $KHSO_5$, the amount of base that was added to the first filtrate being such that the molar ratio of $KHSO_5/(KHSO_4+K_2SO_4)$ in the second filtrate is greater than 1.0, neutralizing the second filtrate with potassium base to increase the K/S ratio of the second filtrate to 1.15-1.25, adding the second filtrate to a $KHSO_5$-rich solution having a molar ratio of KHSO$_5$/(KHSO$_4$ + K$_2$SO$_4$) greater than 2.5 to form a final mixture having a ratio of KHSO$_5$/(KHSO$_4$ + K$_2$SO$_4$) of between 1.3 and 7.3, concentrating the final mixture in a vacuum crystallizer until the water content of the final mixture is 12–40 wt.% to produce a slurry containing between 14 and 60 wt.% of solids at about 15° to 35° C., separating the slurry into a wet cake and a mother liquor using a filter or a centrifuge, and drying the wet cake to produce the inventive compositions.

Another way to perform the alternative process is to add the required amount of base to the initial water slurry of the partially-dissolved triple salt before the undissolved portion of the triple salt is removed, to form the desired amount of additional insoluble K$_2$SO$_4$. This mixture is then filtered to remove the precipitated K$_2$SO$_4$. In this way, all the K$_2$SO$_4$ is removed in one step.

The weight ratio of water to Oxone ® must be 0.5 to 2.5, and preferably 0.75 to 1.5, because a minimum ratio of 3 is required to fully dissolve Oxone ®.

DETAILED DESCRIPTION OF THE INVENTION

Figure 1:
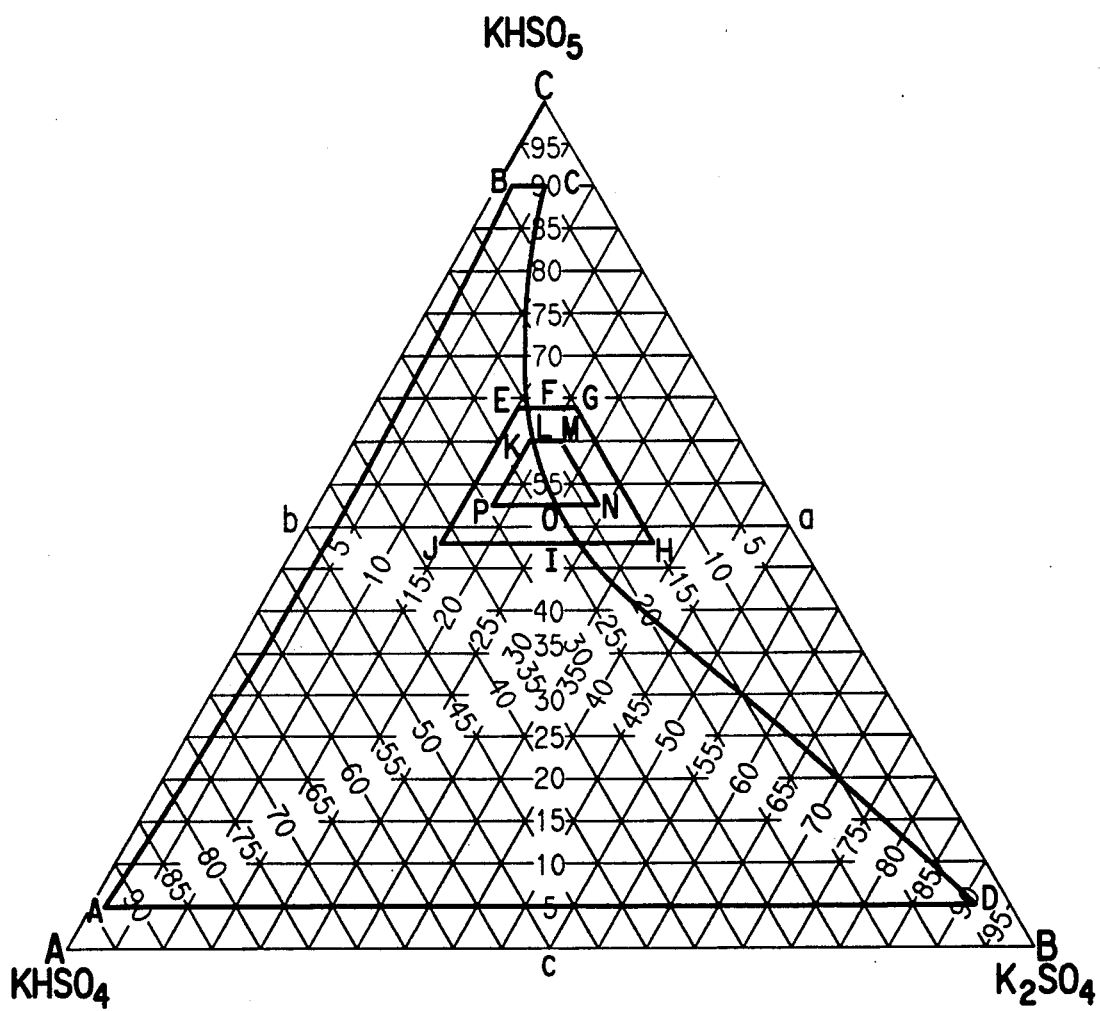
FIG. 1 is a ternary diagram in which the area of the closed curve FGHIF represents the triple salt compositions of the present invention, the area of the closed curve LMNOL represents a preferred embodiment of the triple salt compositions of the present invention, the area of the closed curve EGHJE represents triple salt compositions made by an inventive process, the area of the closed curve KMNPK represents preferred triple salt compositions made by the inventive process, and the area of the closed curve ABCDA represents triple salt compositions disclosed in U.S. Pat. No. 3,041,139.

The compositions of the present invention are storage-stable crystalline triple salts of potassium monopersulfate, potassium hydrogen sulfate and potassium sulfate having the formula $$(KHSO_5)_x \cdot (KHSO_4)_y \cdot (K_2SO_4)_z$$

where $x+y+z=1$, and $x=0.48$–$0.64$, $y=0.15$–$0.37$, and $z=0.15$–$0.37$. In a preferred embodiment, $x=0.52$–$0.60$, $y=0.18$–$0.30$ and $z=0.18$–$0.30$. The inventive triple salt compositions do not melt below 90° C., preferably not below 110° C., and have an active oxygen content of 4.9–6.7%, preferably 5.3–6.3%. The compositions of the invention can be blended with 1–5 wt.%, preferably 1–2.5 wt.%, of an anticaking agent including a basic magnesium compound such as MgCO$_3$, Mg(OH)$_2$, MgO or mixtures thereof. Magnesium carbonate is the preferred basic magnesium compound, along with its complexes with magnesium hydroxide and oxide and various hydrates.

Turning now to the drawing, FIG. 1 is a ternary diagram wherein the triple salt compositions of this invention are shown by the area of the closed curve EGHJE. The preferred compositions are shown by the area of the closed curve KMNPK.

The inventive compositions can be made by one of two processes. In the first process, the compositions are made by providing a solution of Caro's acid having a molar ratio of H$_2$SO$_5$/H$_2$SO$_4$ of 1.6 or more and a water content of 40 to 65 weight percent, partially neutralizing the Caro's acid with a basic potassium compound to form a reaction mixture having a potassium to sulfur ratio (K/S) of 1.15 to 1.25 and a molar ratio of KHSO$_5$/(KHSO$_4$ + K$_2$SO$_4$) greater than 1.0, adding the reaction mixture to a solution that is richer in KHSO$_5$ than the reaction mixture and that has a molar ratio of KHSO$_5$/(KHSO$_4$ + K$_2$SO$_4$) greater than 2.5 to produce a final mixture having a molar ratio of KHSO$_5$/(KHSO$_4$ + K$_2$SO$_4$) of between 1.3 and 7.3, concentrating the final mixture in a vacuum crystallizer until the water content of the final mixture is 12–40 weight percent to produce a slurry containing between 14 and 60 weight percent solids at about 15 to 35° C., separating the slurry into a wet cake and a mother liquor, and drying the wet cake.

Preferably, the KHSO$_5$ of the reaction mixture is enriched by using the mother liquor from a previous crystallization step.

In the second process the desired compositions are made by partially dissolving Oxone ® or a similar triple salt of Caro's acid in water, removing the undissolved portion of the salt, which is essentially undissolved K$_2$SO$_4$, to obtain a first filtrate, adding a potassium base to the first filtrate at 15 to 35° C. to neutralize part of the remaining KHSO$_4$ in the first filtrate to additional insoluble K$_2$SO$_4$, removing the precipitated K$_2$SO$_4$ from the neutralized first filtrate to yield a second filtrate rich in KHSO$_5$, the amount of base added to the first filtrate being such that the molar ratio of KHSO$_5$/(KHSO$_4$ + K$_2$SO$_4$) in the second filtrate is greater than 1.0, neutralizing the second filtrate with a potassium base to increase the K/S ratio of the second filtrate to 1.15–1.25, adding the second filtrate to a KHSO$_5$-rich solution having a molar ratio of KHSO$_5$/(KHSO$_4$ + K$_2$SO$_4$) greater than 2.5 to obtain a final mixture having a molar ratio of KHSO$_5$/(KHSO$_4$ + K$_2$SO$_4$) between 1.3 and 7.3, concentrating the final mixture in a vacuum crystallizer until the water content of the final mixture is 12–40 weight percent to produce a slurry containing between 14 and 60 weight percent solids at about 15 to 35° C., separating the slurry into a wet cake and a mother liquor, and drying the wet cake.

An alternative way to perform the second process is to add the required amount of base to the initial water slurry of the partially-dissolved triple salt, before the undissolved portion of the triple salt is removed, to form the desired amount of additional insoluble K$_2$SO$_4$. This mixture is then filtered to remove the precipitated K$_2$SO$_4$. In this way, all the K$_2$SO$_4$ is removed in one step.

Process Using Caro's Acid

The first step of the first process for preparing the inventive triple salt compositions is to react Caro's acid with a basic potassium compound. Preferably, the Caro's acid is prepared by reacting oleum containing 60 to 70% SO$_3$ with aqueous hydrogen peroxide containing 65 to 75% by weight hydrogen peroxide. The reaction is carried out at 5 to 25° C., preferably 5 to 15° C. A preferred molar ratio of oleum (as sulfuric acid equivalent) to peroxide is from 1.1 to 1.5, and the preferred ratio of H$_2$SO$_5$/H$_2$SO$_4$ in the resulting Caro's acid is 1.6 or higher.

Alternatively, Caro's acid can be made from concentrated sulfuric acid, but about double the molar equivalent of acid is required to obtain similar yields of H$_2$SO$_5$, which adds to the manufacturing cost. Also, the molar ratio of H$_2$SO$_5$ to H$_2$SO$_4$ is less than desired for the preparation of the triple salt compositions of this invention.

The oleum is added to a well-stirred aqueous solution of the hydrogen peroxide while maintaining the temperature of the mixture within the desired range, and the mixture is stirred for 0.25 to 2 hours to insure that the reaction is complete. The Caro's acid is then diluted with water to a water content of 40 to 65% by weight, preferably 50-60% by weight. The dilution enables higher yields in the subsequent neutralization step by minimizing the decomposition of $KHSO_5$.

The diluted $H_2SO_5/H_2SO_4$ mixture is neutralized with a basic potassium compound such as KOH, $KHCO_3$, or $K_2CO_3$, which is preferably in an aqueous solution, to form a "reaction mixtures" wherein $H_2SO_5$ is neutralized to $KHSO_5$, and $H_2SO_4$ is neutralized to $KHSO_4$ and $K_2SO_4$. During the neutralization, the temperature is kept below 35° C. to avoid the loss of active oxygen. The K/S ratio of the reaction mixture should be in the range of 1.15 to 1.25, and preferably 1.18 to 1.22 to obtain the desired composition. If the K/S ratio is higher than 1.25, the amount of $K_2SO_4$ in the end product is too high, which lowers the a.o. content below the desired range. If the K/S ratio is below 1.15, the melting point of the end product is too low for satisfactory processing.

$KHSO_5$ has the greatest solubility of the three potassium salts in the reaction mixture and, therefore, crystallization of the reaction mixture yields a product lower in $KHSO_5$ than the starting material.

One way to produce a product that has the same composition as the reaction mixture is to remove all the water from the reaction mixture (in a tray drier, for example) to yield products that are of similar composition to those of the present invention. However, compositions produced by such a process, when compared to the crystallized products of the present invention, do not have the same crystalline characteristics nor the same uniformity in composition on a microscopic level. As taught in U.S. Pat. No. 4,579,725, the crystalline form of the $KHSO_5/KHSO_4/K_2SO_4$ particles can affect not only the melting point of the product, but also its storage stability.

The present invention is based on the discovery that triple salt compositions that were judged insufficiently stable according to the teachings of U.S. Pat. No. 3,041,139 (when tray dried samples were tested) are stable when a crystallized material of the same overall composition is made by the processes of the present invention.

Stable products having a high a.o. content can be prepared by making a final mixture by mixing the above reaction mixture with a solution much richer in $KHSO5$ before the reaction mixture is crystallized. By properly controlling the evaporation and crystallization of the final mixture, the resulting crystal compositions have approximately the same composition as in the reaction mixture fed to the crystallizer, and the dried isolated solids are stable and nonhygroscopic. Furthermore, the mother liquor from the evaporative crystallizer has approximately the same composition as the $KHSO_5$-rich solution originally added to the reaction mixture, and thus can be used again in the crystallization of another reaction mixture.

The composition of the $KHSO_5$-rich solution (or mother liquor) should be 73 to 98.7 mole % $KHSO_5$, 1-26.7 mole % $KHSO_4$, and 0.3-26 mole % $K_2SO_4$, preferably 78-98.7 mole % $KHSO_5$, 0.7-21.7 mole % $KHSO_4$ and 0 3-21 mole % $K_2SO_4$. The mole ratio of $KHSO_5/(KHSO_4+K_2SO_4)$ should be 2.5 or greater, and preferably 3.5 or greater. Preferably, the composition of the final mixture (the reaction mixture and the $KHSO_5$-rich solution) in the crystallizer during the crystallization step should be 59-86 mole % $KHSO_5$, 2-29 mole % $KHSO_4$ and 12-39 mole % $K_2SO_4$ and the mole ratio of $KHSO_5/(KHSO_4+K_2SO_4)$ should be within the range of 1.4-6.1.

The same benefits from the above batch process can be obtained in a continuous process provided that the composition of the solids removed from the system and the composition of the recycled mother liquor are both closely monitored, and that adjustments are made when necessary to maintain the composition of the crystallizer mixture within the desired range, as defined above.

Removal of water may be done by usual evaporative methods, including using vacuum evaporative equipment capable of operation at the desired temperatures and pressures. The crystallization can be carried out at 15–35° C., preferably at 25–32° C., most preferably at 28–30° C. In the most preferred temperature range, the typical pressure within the crystallizer is 22–26 mm Hg.

The crystallization of the final mixture forms a slurry from which the products of the invention are separated from the slurry by centrifugation or filtration to form a wet cake, which is dried at a minimum practical temperature to avoid product decomposition. The wet cake can be air dried at 50–90 C., preferably at 60–70° C. A drying temperature above 90° C. causes undesirable loss of activity of the product.

Before drying, about 1–5 wt.%, and preferably 1–2.5 wt.%, of magnesium carbonate can be blended with the wet cake to prevent caking of the product. Optionally, the magnesium carbonate may be added after drying, or it may be omitted altogether.

Process Using Oxone ®

The process for making the inventive compositions using Oxone ® or a similar triple salt of Caro's acid is similar to the first process that uses a solution of Caro's acid as the starting material.

In the Oxone ® process, the $K_2SO_4$ is removed from the Oxone ®, and the resulting mixture is then treated the same as in the first process, that is, the mixture is neutralized with a potassium base, added to a $KHSO_5$-rich solution, concentrated in a vacuum crystallizer, separated into a mother liquor and a wet cake, and then dried.

The first step in removing the $K_2SO_4$ from the Oxone ® is to partially dissolve the Oxone ® in water. The weight ratio of water added to the Oxone ® is 0.5 to 2.5. At weight ratios below 0.5, an insufficient amount of the Oxone ® dissolves, and at weight ratios above 2.5 too much of the Oxone ® dissolves. At weight ratios above 3, the Oxone ® completely dissolves.

The undissolved portion of the Oxone ® is essentially $K_2SO_4$, and is removed from the partially-dissolved Oxone ® by any convenient means, such as filtration or centrifugation, to produce a first filtrate.

The last step in removing the $K_2SO_4$ from the Oxone ® is to add a potassium base, such as KOH, $KHCO_3$, or $K_2CO_3$, which is preferably in an aqueous solution, to the first filtrate at 15 to 35° C. to neutralize part of the remaining $KHSO_4$ to additional insoluble $K_2SO_4$. The $K_2SO_4$ is removed from the neutralized first filtrate by filtration or centrifugation to produce a second filtrate.

The amount of base added to the first filtrate is such that the molar ratio of $KHSO_5/(KHSO_4 + K_2SO_4)$ in the second filtrate is greater than 1.0.

The second filtrate is then neutralized with a potassium base, added to a $KHSO_5$-rich solution, concentrated in a vacuum crystallizer, separated into a mother liquor and a wet cake, and dried, just as in the first process that used a solution of Caro's acid as the starting material.

Alternatively, the $K_2SO_4$ may be removed from the Oxone ® in one step by adding the required amount of potassium base directly to the partially-dissolved Oxone ® before the undissolved portion of the Oxone ® is removed. The $K_2SO_4$ is removed from this mixture by filtration or centrifugation, and the resulting filtrate is treated as the second filtrate to produce the inventive compositions.

EXAMPLE 1

Preparation of Caro's acid

A three-necked flask, equipped with a thermometer, mechanical stirrer, dropping funnel, and a condenser, was charged with 117.06 g of 70% hydrogen peroxide (2.41 moles) and an ice bath was placed around the flask to cool the peroxide to 4° C. To the flask were added, dropwise, 247.15 g of 65% oleum (2.89 moles) while the temperature was maintained below 15° C. Following the addition of oleum, the mixture was allowed to stand for about two hours and then was diluted by adding the mixture, in a thin stream, to 350 g of deionized water. The temperature during the dilution step was kept below 15° C. The 706 g of diluted acid were transferred to a storage bottle and stored in an ice bath.

B. Preparation of inventive potassium monopersulfate composition

The Caro's acid prepared as above was neutralized with 420.21 g (3.39 mole) of 45.14% potassium hydroxide by adding the hydroxide dropwise to the diluted Caro's acid to form a reaction mixture. The reaction mixture was well stirred during the neutralization and the temperature range was 7–25° C., but generally within 10–13° C. The calculated K/S ratio was 1.18. A crystallizer/evaporator was charged with 213.58 g of a mother liquor from a previous experiment to make the inventive triple salts, with the mother liquor having the following composition:

| Component | Weight percent |
| --- | --- |
| $KHSO_5$ | 63.9% |
| $KHSO_4$ | 3.6% |
| $K_2SO_4$ | 6.4% |
| $H_2O_2$ | 1.3% |
| Molar Ratio of $KHSO_5/(KHSO_4 + K_2SO_4)$ 6.6 | |

Due to limitations in the size of the crystallizer, only a portion (200 ml) of the reaction mixture was added initially to the mother liquor. This final mixture was concentrated under vacuum (29° C., 25 mm Hg), with 100 ml aliquats of the reaction mixture being added to the crystallizer until all of the reaction mixture (855 ml) had been added and a thick slurry had formed. The concentrated slurry was centrifuged in a basket centrifuge to yield the following wet cake and mother liquor:

| | Wet Cake | Mother Liquor |
| --- | --- | --- |
| Weight | 321.7 g | 348.4 g |
| $KHSO_5$ | 53.1 wt % | 62.0 wt % |
| $KHSO_4$ | 15.3 wt % | 3.6 wt % |
| $K_2SO_4$ | 23.5 wt % | 4.8 wt % |
| $H_2O_2$ | 0.9 wt % | 1.5 wt % |
| Molar Ratio of $KHSO_5/(KHSO_4 + K_2SO_4)$ 7.5 | | |
| Wet cake formula: $(KHSO_5)0.58 \cdot (KHSO_4)0.19 \cdot (K_2SO_4)0.23$ | | |

The wet centrifuge cake was placed in an evaporating dish and dried at 65° C. for 2 hours, during which time the cake was removed from the oven and periodically turned over and mixed to aid its drying. To further improve the drying process, after the 2 hours in the oven the cake was split into three portions and further dried as before for an additional 90 minutes. The weight loss on drying was 5.2%. The dried cake was blended with magnesium carbonate (2.44 % by weight) and stored in a jar at room temperature. The active oxygen content of the sample was 5.77% and did not melt when heated to 150° C.

The active oxygen content of the dried cake was measured after 22 days and found to be 5.43%, which represents a loss rate of 8% per month. The active oxygen content after 24 days of storage was 5.35%, a loss rate of 3.2% per month. After 299 days of storage, the activity of the dried cake was 4.93%, a loss rate of 0.8% for this time period. The initial rapid loss of activity is attributed to inadequate initial drying of the sample.

EXAMPLE 2

This Example is similar to Example 1, but included an improved drying procedure.

Caro's acid was prepared as in Example 1 and neutralized to form a reaction mixture having a K/S ratio of 1.18. The crystallizer was charged with 176.04 g of a mother liquor having the following composition:

| $KHSO_4$ | 54.0% by weight |
| --- | --- |
| $KHSO_4$ | 8.8% |
| $K_2SO_4$ | 11.3% |
| Molar ratio of $KHSO_5/(KHSO_4 + K_2SO_4)$ 2.7 | |

The reaction mixture was added to the crystallizer as described in Example 1, concentrated and centrifuged. The analysis of the wet cake and mother liquor recovered are shown below:

| | Wet Cake | Mother liquor |
| --- | --- | --- |
| Weight | 311.6 g | 303.6 g |
| $KHSO_5$ | 52.0 wt % | 63.9 wt % |
| $KHSO_4$ | 18.7 wt % | 2.0 wt % |
| $K_2SO_4$ | 26.1 wt % | 6.6 wt % |
| Molar Ratio of $KHSO_5/(KHSO_4 + K_2SO_4)$ 8.0 | | |
| Wet Cake formula: $(KHSO_5)0.54 \cdot (KHSO_4)0.22 \cdot (K_2SO_4)0.24$ | | |

The wet cake was spread on paper towel, air dried overnight, and then ground and passed through a 20 mesh screen. The screened sample (all but 50 g) was then dried at 65.C with hot air for 45 minutes. The drier used was a 500 ml stainless beaker with a shaft attached to its base and mounted at about a 30 degree angle on a stirrer motor. The beaker was baffled to help tumble the wet cake as the stirrer motor was turned slowly. Hot air, from a heat gun, was aimed at the center of the beaker, and air temperature was monitored by having a thermometer inside the beaker in contact with the tumbling solids.

The dried product was blended with magnesium carbonate, 2.44% by weight, and found to have an active oxygen content of 5.49%, which is equivalent to 5.63% on a magnesium carbonate free basis. This sample is referred to as Sample A.

The retained sample (50g) was divided into two 25g portions, Samples B and C. Sample B was blended with 0.25g of magnesium carbonate and dried as before. The active oxygen content of the dried material was 5.63%, which is 5.69% on a magnesium carbonate free basis. Sample C was mixed with 0.5g of magnesium carbonate and dried as before. The active oxygen content of Sample C was 5.56%, which is 5.64% on a magnesium carbonate free basis. The long term stability of these samples is shown below:

| Sample Code | Days | a.o. | Cumulative a.o. Loss Per Month |
|---|---|---|---|
| A | 0 | 5.49% | — |
|  | 58 | 5.39 | 0.9% |
|  | 254 | 5.32 | 0.4 |
|  | 770 | 4.55 | 0.7 |
| B | 0 | 5.63% | — |
|  | 58 | 5.55 | 0.7% |
|  | 254 | 5.40 | 0.5 |
|  | 770 | 5.30 | 0.2 |
| C | 0 | 5.53% | — |
|  | 58 | 5.53 | 0.0% |
|  | 254 | 5.39 | 0.3 |
|  | 770 | 5.10 | 0.3 |

EXAMPLE 3

Preparation of the Inventive Compositions from Oxone ®

750 g of commercial grade Oxone® (formula $(KHSO_5)0.47 \cdot (KHSO_4)0.30 \cdot (K_2SO_4)0.24$, a.o. = 4.9%) was dissolved in 750 g of deionized water and the solution was neutralized with 45.18 g (0.36 mole) of 44.7% potassium hydroxide to form a reaction mixture. The KOH was added to neutralize part of the $KHSO_4$ in the solution to $K_2SO_4$.

The $K_2SO_4$, which is insoluble in this reaction mixture, can be filtered out. The amount of KOH added was based on the calculation that removing an additional 0.36 mole of $K_2SO_4$ from the neutralized mixture yields a neutralized Caro's acid mixture with a mole ratio of $KHSO_5/(KHSO_4+K_2SO_4)$ of approximately 1.8. Past experience had shown that a mole ratio of 1.6 or greater is desirable for isolating the products of the invention.

The reaction mixture was filtered and the filter cake was washed with 100 ml of deionized water to remove any residual mother liquor from the cake. The wash water was combined with the initial filtrate, and the combined filtrates (first filtrate) and the cake were analyzed as follows:

| Weight | Filter Cake 254.7 g | First Filtrate 1376.7 g |
|---|---|---|
| $KHSO_5$ | 0.9 wt % | 23.3 wt % |
| $KHSO_4$ | 0.1 wt % | 8.8 wt % |
| $K_2SO_4$ | 92.4 wt % | 3.9 wt % |
| Molar Ratio of $KHSO_5/(KHSO_4 + K_2SO_4)$ |  | 1.75 |

| K/S Ratio 1.09 |
|---|

The first filtrate was then neutralized further with aqueous 44.7 wt.% potassium hydroxide (53.0 g, 0.42 mole) to raise its K/S ratio from 1.09 to 1.22. The neutralized first filtrate was then fed to the crystallizer containing 1004.7 g of mother liquor from a previous batch, concentrated and the product was centrifuged as before.

| Weight | Initial Mother Liq. 1004.7 g | Final Mother Liq. 852.9 g | Wet Cake 434.8 g |
|---|---|---|---|
| $KHSO_5$ | 50.6 wt % | 64.2 wt % | 50.9 wt % |
| $KHSO_4$ | 5.7 wt % | 4.3 wt % | 16.7 wt % |
| $K_2SO_4$ | 3.9 wt % | 3.7 wt % | 31.2 wt % |
| Molar Ratio of $KHSO_5/(KHSO_4 + K_2SO_4)$ | 5.2 | 8.0 |  |
| a.o. (Dry basis) |  |  | 5.4 |
| Wet cake formula: $(KHSO_5)0.53 \cdot (KHSO_4)0.19 \cdot (K_2SO_4)0.28$ | | | |

To further increase the a.o. of the centrifuge cake, the wet cake and the final mother liquor were returned to the crystallizer and the mixture was concentrated. The resulting slurry was centrifuged as before and the recovered mother liquor (666.3 g) was diluted with deionized water (206.2 g) to keep it from further crystallizing on standing. The centrifuge cake (566.9 g) was air dried for 3 days and analyzed along with the mother liquor:

|  | Mother Liquor | Centrifuge Cake |
|---|---|---|
| $KHSO_5$ | 49.6% | 58.6% by weight |
| $KHSO_4$ | 3.0 | 15.9 |
| $K_2SO_4$ | 3.7 | 24.5 |
| Molar Ratio of $KHSO_5/(KHSO_4 + K_2SO_4)$ 7.5 | | |
| a.o. (Dry basis) 6.2 | | |
| Wet cake formula: $(KHSO_5)0.60 \cdot (KHSO_4)0.18 \cdot (K_2SO_4)0.22$ | | |

The air dried centrifuge cake was ground and sieved successively through a 20 mesh, a 50 mesh and a 100 mesh screen. The middle cuts (-20 to +100 mesh) were combined and sieved once more through a 100 mesh screen. The fraction retained (456.5 g) was blended with magnesium carbonate (1.0% by weight) and dried with hot air as usual. After 554 days of storage, the active oxygen content of the sample had declined form 6.21% to 6.00%, for a cumulative loss rate of 0.2% per month.

We claim:

1. A process for preparing a stable, nonhygroscopic potassium monopersulfate composition comprising the steps of:
   providing a Caro's acid having a molar ratio of $H_2SO_5/H_2SO_4$ of 1.6 or greater and a water content of 40 to 65 weight percent,
   partially neutralizing the Caro's acid was a basic potassium compound to form a reaction mixture having a potassium to sulfur ratio (K/S) of 1.15 to 1.25 and a molar ratio of $KHSO_5/(KHSO_4+K_2SO_4)$ greater than 1.0,
   adding the reaction mixture to a solution that is richer in $KHSO_5$ than the reaction mixture and that has a molar ratio of $KHSO_5/(KHSO_4+K_2SO_4)$ of between 2.5 ad 75.9 to produce a final mixture having a molar ratio of $KHSO_5/(KHSO_4+K_2SO_4)$ of between 1.4 and 6.1 wherein the amount of KHSO$_4$ is between 2 and 29 mole percent, concentrating the final mixture until the water content of the final mixture is 12 to 40 weigh percent to produce a slurry having between 14 and 60 weight percent solids, separating the slurry into a wet cake and a mother liquor, and drying the wet cake to produce a potassium monopersulfate composition of the formula (KHSO$_5$)$_x$(KHSO$_4$)$_y$(K$_2$SO$_4$)$_z$ where $x+y+z=1$ and $x=0.48$–$0.64$, $y=0.15$–$0.37$, and $z=0.15$–$37$.

2. The process of claim 1, wherein the final mixture is concentrated in a vacuum crystallizer at 15 to 30° C.

3. The process of claim 1, wherein the KHSO$_5$-rich solution is a mother liquor obtained from an earlier crystallization according to the process of claim 1.

4. The process of claim 1, wherein the Caro's acid has a water content of 50–60wt.%.

5. The process of claim 1, wherein the ratio of K/S of the reaction mixture is 1.18–1.22.

6. The process of claim 1, wherein the mole ratio of KHSO$_5$/(KHSO$_4$+K$_2$SO$_4$) in the reaction mixture is 1.3 or greater.

7. The process of claim 1, wherein the mole ratio KHSO$_5$/(KHSO$_4$+K$_2$SO$_4$) of the KHSO$_5$-rich solution is between 3.5 and 75.9.

8. The process of claim 1, wherein the concentrated slurry contains between 35–55 wt.% solids.

9. The process of claim 1, wherein the wet cake is dried with hot air at 60–70° C.

10. The process of claim 1, further comprising blending the dried product with 1–2.5 wt.% MgCO$_3$ anticaking agent.

11. The process of claim 1, further comprising blending the wet cake with 1–2.5 wt.% MgCO$_3$ anticaking agent before drying the wet cake.

12. The process of claim 1, wherein $X=0.52$–$0.60$, $y=0.18$–$0.30$, and $z=0.18$–$0.30$.

13. The process of claim 2, wherein the mixture in the crystallizer is concentrated under vacuum to a water content of 15–25 Wt.

14. The process of claim 2, wherein the temperature in the crystallizer is 25–32° C.

15. The process of claim 2, wherein the temperature in the crystallizer is 28–30° C. and the pressure in the crystallizer is 22–26 mm Hg.

16. A process for increasing the active oxygen content of a product containing the triple salt 2KHSO$_5$.KHSO$_4$.K$_2$SO$_4$ comprising the steps of dissolving a product containing the triple salt 2KHSO$_5$.KHSO$_4$. K$_2$SO$_4$ in an amount of water insufficient to dissolve all the triple salt, removing the undissolved portion of the salt, which is essentially undissolved K$_2$SO$_4$, to obtain a first filtrate, adding a potassium base to the first filtrate at 15 to 35° C. to neutralize part of the remaining KHSO$_4$ in the first filtrate to additional insoluble K$_2$SO$_4$, removing the precipitated K$_2$SO$_4$ from the neutralized first filtrate to yield a second filtrate rich in KHSO$_5$, the amount of the potassium base added to the first filtrate being such that the molar ratio of KHSO$_5$/(KHSO$_4$+ in the second filtrate is greater than 1.0, neutralizing the second filtrate with additional potassium base to increase the K/S ratio of the second filtrate to 1.15–1.25, adding the second filtrate to a KHSO$_5$-rich solution having a molar ratio of KHSO$_5$/(KHSO$_4$+K$_2$SO$_4$) of between 2.5 and 75.9 to produce a final mixture having a molar ratio of KHSO$_5$/(KHSO$_4$+K$_2$SO$_4$) of between 1.4 and 6.1 wherein the amount f KHSO$_4$ is between 2 and 29 mole percent, concentrating he final mixture until the water content of the final mixture is 12 to 40 weight percent to produce a slurry having between 14 and 60 weight percent solids, separating the slurry into a wet cake and a mother liquor, and drying he et cake to produce a stable, nonhygroscopic potassium monopersulfate composition of the formula (KHSO$_5$)$_x$·(KHSO$_4$)$_y$·(K$_2$SO$_4$)$_z$ where $x+y+z=1$ and $x=0.48$–$0.64$, $y=0.15$–$0.37$, and $z=0.15$–$0.37$, said potassium monopersulfate composition having an active oxygen content of 4.9 to 6.7 percent.

17. The process of claim 16, wherein the final mixture is concentrated in a vacuum crystallizer at about 15 to 35° C.

18. The process of claim 16, wherein the KHSO$_5$-rich solution is a mother liquor obtained from an earlier crystallization according to the process of claim 25.

19. The process of claim 16, wherein the ratio of weight of water added to the triple salt is 0.5–2.5.

20. The process of claim 16, wherein the mole ratio of KHSO$_5$/(KHSO$_4$+K$_2$SO$_4$) in the second filtrate is 1.3 or greater.

21. The process of claim 16, wherein the the K/S ratio of the final mixture is 1.18–1.22.

22. The process of claim 16, wherein the ratio KHSO$_5$/(KHSO$_4$+K$_2$SO$_4$) of the KHSO$_5$-rich solution is 3.5 to 75.9

23. The process of claim 16, wherein the concentrated slurry contains between 25–55 wt.% solids.

24. The process of claim 16, wherein the wet cake is dried with hot air at 60–70° C.

25. The process of claim 16, further comprising blending the dried product with 1–2.5 wt.% MgCO$_3$ anticaking agent.

26. The process of claim 16, further comprising blending the wet cake with 1–2.5 wt.% MgCO$_3$ anticaking agent before drying the wet cake.

27. The process of claim 1, wherein $x=0.52$–$0.60$, $y=0.18$–$0.30$, and $z=0.18$–$0.30$.

28. The process of claim 17, wherein the final mixture i the crystallizer is concentrated under vacuum to a water content of 15–25 wt.%.

29. The process of claim 17, wherein the temperature in the crystallizer is 25–32° C.

30. The process of claim 17, wherein the temperature in the crystallizer is 28–30° C. and the crystallizer pressure is 22–26 mm Hg.

31. A process for increasing the active oxygen content of a product containing the triple salt 2KHSO$_5$.KHSO$_4$.K$_2$SO$_4$ comprising the steps of:

dissolving a product containing the triple salt 2KHSO$_5$.KHSO$_4$. K$_2$SO$_4$ in an amount of water insufficient to dissolve all the triple salt, adding a potassium base to the partially-dissolved triple salt at 15 to 35° C. to neutralize part of the remaining KHSO$_4$ in the partially-dissolved triple salt to additional insoluble K$_2$SO$_4$, removing the precipitated K$_2$SO$_4$ from the partially-dissolved triple salt to yield a filtrate rich in KHSO$_5$, the amount of the potassium base added to the partially-dissolved triple salt being such that the molar ratio of $KHSO_5/(KHSO_4+K_2SO_4)$ in the filtrate is greater than 1.0, neutralizing the filtrate with additional potassium base to increase the K/S ratio of the filtrate to 1.15–1.25, adding the neutralized filtrate to a $KHSO_5$-rich solution having a molar ratio of $KHSO_5/(KHSO_4+K_2SO_4)$ of between 2.5 and 75.9 to produce a final mixture having a molar ratio of $KHSO_5/(KHSO_4+K_2SO_4)$ of between 1.4 and 6.1 wherein the amount of $KHSO_4$ is between 2 and 29 mole percent, concentrating the final mixture until the water content of the final mixture is 12 to 40 weight percent to produce a slurry having between 14 and 60 weight percent solids, separating the slurry into a wet cake and a mother liquor, and drying the wet cake to produce a stable, nonhygroscopic potassium monopersulfate composition of the formula $(KHSO_5)_x \cdot (KHSO_4)_y \cdot (K_2SO_4)_z$ where $x+y+z=1$ and $x=0.48$–$0.64$, $y=0.15$–$0.37$, and $z=0.15$–$0.37$, said potassium monopersulfate composition having an active oxygen content of 4.9 to 6.7 percent.

* * * * *